United States Patent

Sangani et al.

Patent Number: 5,612,107
Date of Patent: Mar. 18, 1997

[54] MOTTLE PREVENTION FILM OR COATING

[75] Inventors: Nailesh Sangani, Mentor; Carolyn Eberly; Markieta Valvoda, both of Chardon; Robert Rega, Mentor, all of Ohio

[73] Assignee: Avery Dennison Corporation, Pasadena, Calif.

[21] Appl. No.: 394,179

[22] Filed: Feb. 24, 1995

[51] Int. Cl.$^6$ ..................................... C09J 7/02
[52] U.S. Cl. .................. 428/41.7; 428/41.8; 428/352; 428/354
[58] Field of Search ............... 428/40, 343, 352, 428/354, 40.1, 41.7, 41.8

[56] References Cited

U.S. PATENT DOCUMENTS

| | | | |
|---|---|---|---|
| 2,532,011 | 9/1946 | Dahlquist et al. | 154/53.5 |
| 3,129,816 | 2/1962 | Bond et al. | 206/59 |
| 3,669,717 | 6/1972 | Akamatsu et al. | 117/72 |
| 3,797,495 | 3/1974 | Schmidt | 128/287 |
| 4,045,600 | 8/1977 | Williams | 427/379 |
| 4,284,681 | 8/1981 | Tidmarsh et al. | 428/246 |
| 4,362,833 | 12/1982 | Mune et al. | 524/265 |
| 4,559,382 | 12/1985 | Martens et al. | 524/535 |
| 4,605,592 | 8/1986 | Paquette et al. | 428/334 |
| 4,631,229 | 12/1986 | Martens et al. | 428/343 |
| 4,728,571 | 3/1988 | Clemens et al. | 428/352 |
| 5,063,106 | 11/1991 | Nieuwenhuize et al. | 428/343 |
| 5,084,354 | 1/1992 | Krankkala et al. | 428/414 |

OTHER PUBLICATIONS

High Solids Amino Crosslinking Agents, American Cyanamid Company.

Primary Examiner—Jenna Davis
Attorney, Agent, or Firm—Renner, Otto, Boisselle & Sklar

[57] ABSTRACT

A composite construction is described which comprises (A) a layer of plasticized polymer film having a face side and a back side; (B) a release-coated liner having one surface in contact with the back side of the layer of plasticized polymer film; and either (C) a plasticizer-resistant polymer backcoating on the other surface of the release-coated liner (B) which is essentially impervious to the plasticizer in (A); or (D) a removable plasticizer-resistant polymer film in contact with the face side of the layer of plasticized polymer film (A). Such composite constructions are capable of being wound upon themselves in roll form and may be readily unwound for use. When unwound, the presence of mottling on the surface of the vinyl film is observed to be minimized or eliminated.

The invention also relates to a method of preventing the formation of mottling when composites comprising at least a layer of plasticized polymer film and a release-coated liner are either wound upon themselves to form a roll or stacked upon each other. The method comprises applying a plasticizer-resistant polymer backcoating on the surface of the release-coated liner which is not in contact with the plasticized polymer film, or contacting the surface of the plasticized polymer film opposite the release-coated liner with a removable plasticizer-resistant polymer film.

38 Claims, 1 Drawing Sheet

MOTTLE PREVENTION FILM OR COATING

TECHNICAL FIELD

This invention relates to plasticized polymer films and to the prevention of mottle formation in such films. More particularly, the invention relates to multilayer composites which contain a layer of plasticized polymer film and is constructed in a manner to minimize mottling of the plasticized polymer film layer when the composites are stored either in roll or sheet form.

BACKGROUND OF THE INVENTION

Highly plasticized vinyl resin films, and in particular, plasticized polyvinylchloride films and substrates, have been used in a variety of applications. These vinyl substrates may contain as much as 25 to 75 parts of plasticizer to 100 parts of vinyl resin. There is a tendency, however, for the plasticizers to migrate to the surfaces of the vinyl films. One of the problems that has been observed with polyvinyl films, and in particular, cast polyvinyl films, has been the formation of mottle on the surfaces of the vinyl films. Mottle is defined as the presence of matte regions on an otherwise glossy film surface. This problem makes the product aesthetically unattractive in many applications. The problem of mottling is particularly evident and visible in dark-colored films. The development of mottle on vinyl films is a particular problem when the vinyl films are to be used in the preparation of signs and high-end striping.

Mottling has been observed to develop, for example, in cast vinyl facestock when a pressure-sensitive construction containing such facestocks is wound from a roll or is removed from a stack of sheets, and this mottling detracts from the desired uniform glossy appearance of the surface. It has been suggested that the mottling develops as a result of the migration of the plasticizer contained in the highly plasticized vinyl film, and this migration is apparently promoted and enhanced by contact of the vinyl surface with rough porous surfaces such as, paper, film and polycoated release liners which are used in conjunction with the vinyl films when preparing composites.

The problem of plasticizer migration in composites has been previously recognized. For example, U.S. Pat. No. 4,284,681 discloses a composite material having a highly plasticized layer, a fibrous backing layer, and an intermediate plasticizer barrier layer such as polyurethane resin between the polyvinylchloride layer and the fibrous backing. The barrier layer directly contacts the polyvinylchloride layer and is disclosed to reduce migration of plasticizer in the highly plasticized polyvinylchloride layer to or through the backing layer. The composite can be bonded using an adhesive to walls, floors and/or ceilings and is reported to be effective to reduce dust and/or bacteria in the area. The dust and/or bacteria adhere to the exposed surface of the highly plasticized polyvinylchloride layer from which they can be removed by washing.

U.S. Pat. No. 4,045,600 discloses a process in which successive layers of a polyurethane resin are applied directly to a plasticized polyvinylchloride substrate for the purpose of inhibiting plasticizer migration. An object of the process described is a reduction in the tackiness of the surface of the plasticized polyvinylchloride. The patentee describes various polymeric coatings for plasticized polyvinylchloride substrates including acrylic ester polymers, polyvinylacetate, and modified polyamides.

U.S. Pat. No. 4,605,592 describes a multilayer decorative article having, in order, an ink-receptive vinyl film layer, a plasticizer barrier layer and a pressure-sensitive adhesive layer. The adhesive layer is adapted to maintain adhesion to highly plasticized vinyl substrates, and the intermediate barrier layer is reported as being capable of preventing plasticizer from migrating from the vinyl substrate into the vinyl film outer layer. Among the barrier film materials described in the '592 patent are aliphatic polyurethane resins. In addition, the adhesives utilized in the composite are designed to be plasticizer-resistant.

SUMMARY OF THE INVENTION

A composite construction is described which comprises (A) a layer of plasticized polymer film having a face side and a back side; (B) a release-coated liner having one surface in contact with the back side of the layer of plasticized polymer film; and either (C) a plasticizer-resistant polymer backcoating on the other surface of the release-coated liner (B) which is essentially impervious to the plasticizer in (A); or (D) a removable plasticizer-resistant polymer film in contact with the face side of the layer of plasticized polymer film (A). Such composite constructions are capable of being wound upon themselves in roll form and may be readily unwound for use. When unwound, the presence of mottling on the surface of the vinyl film is observed to be minimized or eliminated.

The invention also relates to a method of preventing the formation of mottling when composites comprising at least a layer of plasticized polymer film and a release-coated liner are either wound upon themselves to form a roll or stacked upon each other. The method comprises applying a plasticizer-resistant polymer backcoating on the back surface of the release-coated liner which is not in contact with the adhesive and/or plasticized polymer film, or contacting the surface of the plasticized polymer film opposite the release-coated liner with a removable plasticizer-resistant polymer film.

DESCRIPTION OF THE PREFERRED EMBODIMENTS

The composite constructions of the present invention comprise (A) a layer of plasticized polymer film having a face side and a backside;

(B) a release-coated liner having one surface in contact with the backside of the layer of plasticized polymer film; and either (C) a plasticizer-resistant polymer backcoating on the other surface of the release-coated liner (B) which is essentially impervious to the plasticizer in (A); or (D) a removable plasticizer-resistant polymer film in contact with the face side of the layer of plasticized polymer film (A) which is essentially impervious to the plasticizer in (A).

The layer of plasticized polymer film utilized in the formation of the composite constructions of the present invention may comprise any polymer film containing a significant amount of plasticizer such as from about 10% to about 60% or more by weight. Examples of plasticized polymer films useful in the present invention include, cellulose acetate films, vinyl films, polyolefin films, etc. In one preferred embodiment, the plasticized polymer films used in the constructions of the present invention are plasticized vinyl films such as films of polyvinylchloride, polyvinylacetate, copolymers of vinyl chloride and vinyl acetate, etc.

The plasticized polyvinylchloride resins (sometimes referred to herein as PVC resins) which are suitable for use in the composite constructions of the present invention are well known and are either homopolymers of vinyl chloride or copolymers of vinyl chloride with a minor amount by weight of one or more ethylenically-unsaturated comonomers which are copolymerizable with the vinyl chloride. Examples of these ethylenically-unsaturated comonomers include vinyl halides such as vinyl fluoride and vinyl bromide; alpha-olefins such as ethylene, propylene and butylene; vinyl esters such as vinyl acetate, vinyl propionate, vinyl butyrate and vinyl hexanoate, or partially hydrolyzed products thereof such as vinyl alcohol; vinyl ethers such as methyl vinyl ether, propyl vinyl ether and butyl vinyl ether; acrylic esters such as methyl acrylate, ethyl acrylate, methyl methacrylate and butyl methacrylate and other monomers such as acrylonitrile, vinylidene chloride and dibutyl maleate. Such resins are generally known any many are commercially available. The most preferred polyvinylchloride resin used in the invention is the homopolymer of vinyl chloride.

Examples of polyvinylchloride resins that are commercially available include GEON® 92, a medium high molecular weight porous suspension PVC resin; GEON® 128, a high molecular weight dispersion grade polyvinylchloride resin; and GEON®11X 426FG, a medium molecular weight PVC resin. The GEON® resins are available from the Geon Company. The number average molecular weights of the PVC resins useful in the present invention may range from about 20,000 up to about 80,000, and a typical range of about 40,000 to about 60,000.

The layer of polyvinyl film utilized in the composite constructions of the invention contains significant amounts of plasticizers, generally, from about 10% to about 60% by weight of at least one plasticizer. The plasticizers which are incorporated into the plasticized PVC layer may be any of the substances conventionally used to plasticize PVC resins. These are normally considered to fall into two classes: high molecular weight or polymeric plasticizers (of molecular weight of about 750 to 5000) and low molecular weight of monomeric plasticizers (of molecular weight of about 300 to 1000). The higher molecular weight plasticizers such as chain-stopped polypropylene glycol adipate or poly(1,3-butane diol azolate) often are preferred because of their lower volatility. More specific examples of plasticizers include esters of dibasic organic acids or phosphoric acid, derivatives of castor oil, epoxidized vegetable oils, ethylene glycol derivatives, polyesters, chlorinated paraffin or chlorinated fatty acid esters.

Generally, the plasticizers utilized in the polyvinylchloride films are medium to high-molecular weight liquid di- and tri-esters of organic acids. The primary commercial applications are to modify the stiffness characteristics of the PVC film. Chlorinated polyethylene and ethylene-vinyl acetate resins are examples of the plasticizers which have been referred to as solid plasticizers. These are generally polymers which alloy with the host resin and impart some combination of increased flexibility and impact resistance.

Phthalate esters are the most commonly used class of plasticizers. These compounds are used not only for PVC's, but also for cellulose acetate, polyvinyl acetate, polyolefins, polyurethanes, etc. However, the amount of plasticizer utilized in the polyolefins and polyurethanes is much less than the amount used in PVC resins. A listing of commercially available plasticizers is found in Modem Plastics Encyclopedia, 1993, pp. 326–335. In some applications, the plasticized polymer films utilized in the present invention also may contain conventional compounding ingredients such as stabilizers, fillers, lubricants, pigments, blowing agents, etc.

The polyvinyl films may contain other materials normally used to provide desirable properties to the vinyl films. For example, the vinyl films may also contain: heat and light stabilizers, such as alkyl aryl phosphates and 4,4'-butylidene-bis(6-t-butyl-m-cresol); lubricants; colorants such as dyes and pigments; fillers such as fumed silica; foaming agents, wetting agents; flame-retardants; antistatic agents; thickening agents and coupling agents.

The thickness or caliper of the plasticized polymer film of the composites of the invention may range from about 1 to about 3 mils and is more often in the range of about 1.5 to about 2.5 mils.

The composite constructions of the present invention also may comprise a release-coated liner having one surface (the release-coated surface) in contact with the backside of the layer of plasticized polymer film. The release-coated liner may comprise a substrate sheet of paper, polymer film or combinations thereof coated with a release composition. The typical release coating used in the industry is a silicone-based molecule which can be cured either thermally or with irradiation energy such as ultraviolet light or electron beam. Paper substrates are particularly useful because of the wide variety of applications in which they can be employed. Paper is also relatively inexpensive and has desirable properties such as antiblocking, antistatic, dimensional stability, and can potentially be recycled. Any type of paper having sufficient tensile strength to be handled in conventional paper coating and treating apparatus can be employed as the substrate layer. Thus, any type of paper can be used depending upon the end use and particular personal preferences. Included among the types of paper which can be used is paper, clay coated paper, glassine, polymer coated paper, paperboard from straw, bark, wood, cotton, flax, cornstalks, sugarcane, bagasse, bamboo, hemp, and similar cellulose materials prepared by such processes as the soda, sulfite or sulfate (Krdt) processes, the neutral sulfide cooking process, alkali-chlorine processes, nitric acid processes, semi-chemical processes, etc. Although paper of any weight can be employed as a substrate material, paper having weights in the range of from about 30 to about 120 pounds per ream are useful, and papers having weights in the range of from about 60 to about 100 pounds per ream are presently preferred. The term "ream" as used herein equals 3000 square feet. Examples of specific papers which can be utilized as substrates in preparing the deposit laminates of the present invention include 41-pound offset grade bleached Kraft; 78-pound bleached Kraft paper, etc.

Alternatively, the substrate of the release-coated liner may be a polymer film, and examples of polymer films include polyolefin, polyester, polyvinyl chloride, polyvinyl fluoride (PVF), polyvinylidene difluoride (PVDF), etc., and combinations thereof. The polyolefin films may comprise polymer and copolymers of monoolefins having from 2 to 12 carbon atoms and more preferably from 2 to about 4 or 8 carbon atoms per molecule. Examples of such homopolymers include polyethylene, polypropylene, poly-1-butene, etc. The examples of copolymers within the above definition include copolymers of ethylene with from about 1% to about 10% by weight of propylene, copolymers of propylene with about 1% to about 10% by weight of ethylene or 1-butene, etc. Films prepared from blends of copolymers or blends of copolymers with homopolymers also are useful. In addition films may be extruded in mono or multilayers.

A third type of material used as a substrate for the release liner is a polycoated kraft liner which is basically comprised of a kraft liner that is coated on either one or both sides with a polymer coating. The polymer coating, which can be comprised of high, medium, or low density polyethylene, propylene, polyester, and other similar polymer films, is coated onto the substrate surface to add strength and/or dimensional stability to the liner. The weight of these types of liners ranges from 30 to 100 pounds per ream, with 40 to 94 pounds per ream representing a typical range. In total, the final liner is comprised of between 10% and 40% polymer and from 60% to 90% paper. For two sided coatings, the quantity of polymer is approximately evenly divided between the top and bottom surface of the paper.

The release coating which is contained on the substrate to form the release-coated liner may be any release coating known in the art. Silicone release coatings are preferred, and any of the silicone release coating compositions which are known in the art can be used. The major component of the silicone release coating is a polyorganosiloxane and more often, polydimethylsiloxane. The silicone release coating compositions used in this invention may be thermally cured or radiation cured. Generally, the thermally curable compositions comprise at least one polyorganosiloxane and at least one catalyst or curing agent for such polyorganosiloxane(s). Such compositions may also contain at least one cure accelerator and/or adhesivity promoter (sometimes referred to as an anchorage additive). As is known in the art, some materials have the capability of performing both functions, i.e., the capability of acting as a cure accelerator to increase the rate, reduce the curing temperature, etc., and also as an adhesivity promoter to improve bonding of the silicone composition to the substrate. The use of such dual function additives where appropriate is within the purview of the invention.

A wide variety of polyorganosiloxanes (commonly called silicones) can be used in the practice of the invention. Such polyorganosiloxanes are also sometimes referred to as polymeric silicone resins, rubbers, oils or fluids. These compositions are well known and fully described in the literature. These compositions are comprised essentially of silicon atoms connected to each other by oxygen atoms through silicon-oxygen linkages, e.g., wherein each R is an organic group, generally an alkyl group. The compositions used in the practice of the invention are preferably, but not necessarily, high molecular weight polymers and copolymers having molecular weights in the range of 5,000 to 250,000. They should not have obtained such a degree of polymerization or condensation that they are no longer soluble in common hydrocarbon solvents such as xylene, toluene, methyl ethyl ketone, and carbon tetrachloride. In general, any organic solvent having a boiling point equal to or less than that of xylene can be used in the compositions used in the practice of the invention. The solvent merely serves as a convenient vehicle or carrier for uniform application to the substrate. Thus, higher boiling solvents can be used but require so much time for their control that their use is not commercially economical. Various polyorganosiloxanes are commercially available in organic solvents in various percent solids concentration. Exemplary of the silicone (polyorganosiloxane) materials which can be used in forming the silicone release coatings of the invention are those disclosed in U.S. Pat. Nos. 2,258,218; 2,258,220; 2,258,222; 2,494,920; 3,432,333; and 3,518,325.

Suitable catalysts which can be employed in the curing of the polyorganosiloxane release compositions of the invention include various compounds containing metals such as tin, lead, platinum, rhodium, etc. Generally, the catalysts are tin, platinum or rhodium compounds such as the dialkyl tin esters. Specific examples of catalysts include: dibutyl tin diacetate, dibutyl tin di-ethylhexanoate, dihexyl tin di-2-ethyl hexanoate, ethyl tin trihexanoate, dibutyl tin dilaurate, octadecyl tin dilaurate, dibutyl tin diacetate, tri-butyl tin acetate, dibutyl tin succinate, various lead salts such as lead naphthenate and lead octoate, zinc octoate, zinc stearate, iron octoate, various organic peroxides such as benzoyl peroxide and 2,4-dichlorobenzoyl peroxide; and others well known in the art as curing agents or catalysts for polyorganosiloxane (silicone) materials. Presently preferred catalysts include the carboxylic acid salts of organolin compounds containing at least one carbon-tin bond such as those previously mentioned. Metal complexes of platinum and rhodium are also useful. Amines and amines derivatives such as diethylene triamine, triethylene tetramine and ethanol amine, as well as amine precursors such as the isocyanate compounds and amine-functional silanes such as gamma-aminopropyl triethoxy silane can also be used as curing catalysts. The amine salts of carboxylic acids can also be used as curing agents in the silicon release coatings of the invention.

The cure accelerators and/or adhesivity promoters which can be used in the silicone release coating, are also well known in the art. Exemplary of such cure accelerators and/or adhesivity promoters are amines, amine-functional silanes and amine precursors previously discussed as well as other silane derivatives such as acetoxy-functional silanes of the type vinyl and orthosilicates such as tetra(diethylene glycol monomethyl ether) silane. Orthosilicates which have been found to be advantageous include ethylene glycol derivatives having the formula $Si[(OC_2H_4)_2OR]_4$, wherein R is alkyl or alkenyl radical having up to 8 carbon atoms, e.g., methyl, ethyl, isopropyl, butyl, octyl, vinyl, allyl, etc., and $Si(OCH_2H_4OR^1)_4$ wherein $R^1$ is an alkyl or alkenyl radical having up to 8 carbon atoms, e.g., methyl, propyl, butyl, pentyl, hexyl, allyl, pentenyl, etc. Isocyanate compounds which have been found to be effective in the practice of the invention include any isocyanate which is soluble in organic solvents and which has an average of at least two isocyanate groups per molecule. Such isocyanates can be monomeric or polymeric in nature, e.g., the isocyanate can be a partially hydrolyzed toluene diisocyanate. In other words, a urea or polyurea which still retains isocyanate groups in the molecules or a polybiuret containing unreacted isocyanate groups are typical of the isocyanate compound which can be used in the practice of the invention. Other such isocyanates include the reaction products of an isocyanate with a polyhydroxyl compound (i.e., a polyurethane or allophanates derived therefrom), the reaction product of an isocyanate and a polyamine which reaction products contain unreacted isocyanate groups. In addition the isocyanate can be a polymeric material in which the polymerization is effected by mechanisms not involving the isocyanate group.

At least some of these compounds also function as curing catalysts per se as well as cure accelerators and/or adhesivity promoters. The mount of curing agent or catalyst, cure accelerator and/or adhesivity promoter employed in the silicone release coatings of the invention can be varied widely depending upon the curing temperature, the particular catalyst used, the particular polyorganosiloxane materials selected, the particular cure accelerator and/or adhesivity promoter used, the substrate, desired curing time, etc. Usually the amount of any of such components will be in the range of 0.5 to 20 weight percent of the silicone material employed.

The silicone release compositions can be applied as solutions in organic solvents, as emulsions in water, or neat (solventless), particularly when the silicone composition is a liquid.

The coating materials described herein can be conveniently applied by any coating technique employing any type of roll coater, knife coater, or other coating device which is capable of applying a coating of the coating material in the desired mount.

Curing of said polyorganosiloxane coating material can take place at room temperature depending upon the particular silicone material used and the particular curing agent or catalyst used in conjunction with said silicone material. To avoid premature curing of silicones, the selected catalyst is typically hindered with molecules that act as blocking agents. At elevated temperatures these blocking agents disassociate from the catalyst thereby initiating the silicone cure reaction. However, for practical continuous operations the time required for curing at room temperature is too long. Most curing agents or catalysts are capable of promoting relatively rapid curing at moderate elevated temperatures. This temperature at which relatively rapid curing takes place is sometimes referred to as the curing initiating temperature even though curing will take place at room temperature. For the preferred polyorganosiloxanes described herein this temperature is in the range of 160° F. to 650° F. Once curing has been initiated and maintained at an elevated temperature for a short period of time as described herein, the curing can then advantageously be allowed to proceed by aging at reduced temperatures, e.g., at room temperatures or moderately (25° F. to 50° F.) above. The choice of temperature actually employed in the curing steps will depend upon a number of factors such as the type of silicone coating material used, the curing catalyst used with said silicone material, and the rate at which the coated substrate is passed through the heating zone.

Radiation-curable silicone release compositions also are useful and easy to apply to the substrate. Radiation-curable organopolysiloxanes can be cured by ultraviolet or electron beam radiation with or without the assistance of a photoinitiator such as benzophenone. One type of organopolysiloxane which is useful in preparing release coatings contain acryloxy groups, methacryloxy groups, or mixtures thereof. A variety of acryloxy or methacryloxy containing organopolysiloxanes are known and can be used for release coatings. In one embodiment, the organopolysiloxane compounds containing acryloxy and/or methacryloxy groups which can be utilized in the present invention may be presented by the general Formula I $$[R_nSiO_{4-n/2}]_m \qquad (I)$$

wherein each R is acryloxy, methacryloxy, an n-substituted monovalent hydrocarbon group containing from 1 to 20 carbon atoms or a substituted monovalent hydrocarbon group wherein the substituents are selected from the class consisting of chloro-, fluoro-, cyano-, amido-, nitro-, ureido-, isocyanato-, carbalkoxy-, hydroxy-, acryloxy-, methacryloxy-, etc.; n has an average value of about 1.8 to 2.2; and m has an average value greater than 2, preferably greater than about 25, and more preferably, from about 100 to about 500; the organopolysiloxane containing an avenge of at least one R group which contains an acryloxy or methacryloxy group, namely, $$CH_2=C(X)C(O)-O- \qquad (II)$$

X is hydrogen or methyl. The substituents represented by R in structure I include, for example, monovalent aliphatic groups such as methyl, ethyl, propyl, hexyl, etc.; monovalent cycloaliphatic groups such as cyclohexyl, cyclopentyl, etc.; aryl groups such as phenyl, methylphenyl, benzyl, etc.; alkenyl groups such as vinyl, allyl, 3-butenyl, etc. Examples of R groups which are substituted hydrocarbon groups include pentachlorophenyl, aminomethyl, 3-aminopropyl, etc.

Each acryloxy or methacryloxy group is attached to the siloxane backbone through a carbon-to-silicon bond or a carbon-oxygen-silicon bond. More often, there are present an average of from about 2 to about 25, more preferably from about 2 to about 10 of the R groups containing an acryloxy or methacryloxy group. Alternatively, the organopolysiloxane compounds containing acryloxy and/or methacryloxy groups useful in the present invention may be defined as containing from about 3% to about 75% by weight of acryloxy or methacryloxy groups, more often from about 3% to about 50% by weight of the acryloxy or methacryloxy groups. Such polysiloxanes which are useful in this invention have an avenge molecular weight of from about 1000 to about 20,000. Siloxanes of higher molecular weight aim may be used but the higher molecular weight siloxanes are not preferred.

Typically, the R groups in Formula I have the structure $$CH_2=C(X)C(O)-O-R'- \qquad (III)$$

wherein R' is a divalent hydrocarbon group of from 1 to 15 carbon atoms or an oxyalkylene group containing from 1 to about 4 carbon atoms in the alkylene moiety.

The siloxanes containing the acryloxy or methacryloxy groups of Formula III can be prepared, for example, by reacting a siloxane containing hydroxyl groups or epoxy groups with acrylic acid or methacrylic acid. The siloxanes containing hydroxyl groups may be prepared by reacting a reactive siloxane (e.g., containing halogen) with a polyhydroxy compound such as ethylene glycol, propylene glycol, glycerol or pentaerythritol.

The organopolysiloxanes described above may be linear or branched and are preferably substantially linear. As will be recognized by those skilled in the art, the organopolysiloxanes of Formula III will also have an appropriate number of end-capping units, $R_3S_iO-$ at the terminals of the molecule where R is as previously defined.

The organopolysiloxanes containing acryloxy and/or methacryloxy groups as described above are generally fluids which have viscosities in the range of from about 25 cps to 10,000 cps. Organopolysiloxanes of the type described above are known in the art, and various methods for producing such organopolysiloxanes are described in the patents identified in the Background. The disclosures of U.S. Pat. Nos. 3,878,263; 4,064,286; 4,301,268; 4,306,050; 4,908,274; 4,963,438; 4,978,726; and 5,034,491 are hereby incorporated by reference for their disclosure of acrylate or methacrylate containing organopolysiloxanes and methods of preparing organopolysiloxanes containing acryloxy and/or methacryloxy groups useful in the compositions of the present invention.

Organopolysiloxanes containing acryloxy and/or methacryloxy groups are available commercially from, for example, Goldschmidt Chemical Corp., Hopewell, Va. Goldsehmidt's silicone acrylate series include dimethylpolysiloxanes available under the general trade designation Tergo® RC, and more particularly, under designations such as RC 450, RC 450N, RC 706, RC 707, RC 710, RC 720 and RC 726. Some of these polysiloxanes are of the type prepared by the reaction of acrylic acid or methacrylic acid with dimethylpolysiloxane containing hydroxyl groups or epoxy groups.

In another embodiment, the radiation-curable silicone release composition which can be applied as the third coating comprises a mixture of at least two classes of materials: (i) an organopolysiloxane containing acryloxy or methacryloxy groups described above, and (ii) acrylated or methacrylated organic polyhydroxy compounds or polyamino compounds as described above with regard to the first coating composition. The description regarding the acrylated or methacrylated organic polyhydroxy and polyamino compounds used in the first coating is hereby incorporated by reference for convenience and brevity. All of the acrylated and methacrylated organic polyhydroxy and polyamino compounds described above can be used in combination with the above-described polysiloxanes to form useful release coatings.

The weight ratio of (i) organopolysiloxane to (ii) acrylated and methacrylated polyhydroxy and polyamino compounds may vary over a wide range. Thus, the mixture may comprise from about 2% by weight up to about 90% by weight of the polysiloxane and from about 10% to about 98% by weight of the acrylated or methacrylated polyhydroxy and/or polyamino compounds. In another embodiment silicone release compositions can be used which comprise only about 2 to about 7% of the organopolysiloxane and from about 90% to 98% by weight of the acrylated or methacrylated polyhydroxy and/or polyamino compounds. In another embodiment, the release compositions contain from 93% to about 98% by weight of said compounds.

The silicone-release compositions preferably comprise a mixture of more than one acrylated or methacrylated organic polyhydroxy compound or polyamino compound. Such mixtures may comprise two or more derivatives derived from polyhydroxy compounds, two or more compounds derived from polyamino compounds, mixtures of one or more compounds derived from a polyhydroxy compound and one or more compounds derived from a polyamino compound. Thus, in one embodiment, the mixture comprises a mixture of (1) from about 40% to about 70% by weight of at least one acrylated or methacrylated polyamine oligomer and (2) from about 30% to about 60% by weight of at least one acrylated or methacrylated polyhydroxy compound as described above.

In yet another embodiment of the present invention, a portion of the acrylated or methacrylated compound may be replaced by a liquid monoacrylate ester. For example, from about 1% to about 20% by weight of the polyacrylate in the above mixtures may be replaced by a liquid monoacrylate ester to modify the properties of the radiation-curable silicone release composition and, in some instances, the properties of the radiation-cured release composition. The liquid monoacrylate esters generally are characterized by a low viscosity such as from 1 to about 50 cps at 25° C., and these monoacrylate compounds are useful to improve the fluidity of the curable release compositions of the invention. Examples of such liquid monoacrylate esters include ethyl acrylate, butyl acrylate, 2-ethylhexyl acrylate, allyl acrylate, n-amyl acrylate, benzyl acrylate, cyclohexyl acrylate, diethylaminoethyl acrylate, 2-ethoxyethyl acrylate, n-lauryl acrylate, n-octyl acrylate, octadecyl acrylate, etc., the corresponding methacrylates and mixtures thereof.

The monoacrylate and methacrylate compounds do not form a network when polymerized by radiation. However, the monoacrylates do modify the network formed by the polyfunctional acrylates. These monoacrylate compounds normally copolymerize with the polyfunctional acrylates and methacrylates.

The radiation-curable release compositions useful in the present invention optionally may contain at least one photoinitiator. The amount of photoinitiator included in the release compositions may range from about 0% to about 10%, more often from about 0.5% to about 5% based on the total weight of the radiation-curable composition. A photoinitiator is incorporated into the curable release compositions when compositions are to be cured by exposure to non-ionizing radiation such as ultraviolet light. Photoinitiators are not required when the curable silicone is cured by electron beam radiation. Examples of photoinitiators which may be used in combination with ultraviolet light includes, for example, benzyl ketals, benzoin ethers, acetophenone derivatives, ketoxime ethers, benzophenone, benzo or thioxanthones, etc. Specific examples of photoinitiators include: 2,2-diethoxyacetophenone; 2- or 3- or 4-bromoacetophenone; benzoin; benzophenone; benzoquinone; 1-chloroanthroquinone; p-diacetyl-benzene; 9,10-dibromoanthracene; 1,3-diphenyl-2-propanone; 1,4-naphthyl-phenyl ketone; 2,3-pentenedione; propiophenone; chlorothioxanthone; xanthone; and mixtures thereof.

The radiation-curable silicone release compositions are applied to the substrate prior to curing. The amount of silicone release coating applied to the substrate may vary over a wide range but generally, a coating weight of from about 0.1 to about 10 (more typically about 0.3 to 2) or more grams/m$^2$ of release composition is satisfactory. The release compositions may be applied to the substrates by any conventional means known in the coating art such as gravure, reverse gravure, offset gravure, roller coating, curtain coating, brushing, spraying, knife-over roll, metering red, reverse roll coating, doctor knife, dipping, die coating, etc. In one particular embodiment, the liquid radiation-curable release compositions are applied as a third coating using offset gravure techniques. The liquid being applied to the substrate may be heated or cooled to facilitate the coating process and to alter the coating thickness.

The thickness or caliper of the release-coated liner used in the composites of the invention may range from about 4 to about 10 mils, and more often the caliper will be from about 4 or 4.5 mils to about 6 mils. The coating weight of the release coating generally will be in the range of about 0.3 to about 1.5 gms/m$^2$.

The composite constructions of the present invention, as noted above, may comprise either

(C) a plasticizer-resistant polymer backcoating on the other surface of the release-coated liner (B) which is essentially impervious to the plasticizer in the plasticized polymer film layer, or (D) a removable plasticizer-resistant polymer film which is in contact with the face side of the layer of plasticized polymer film (A).

A variety of plasticizer-resistant polymers are known which are useful to provide the backcoating of the release liner or the removable plasticizer-resistant polymer film which is in contact with the face side of the layer of plasticized polymer film (A). Such polymers when present act as plasticizer-resistant back-coatings and films in the composite constructions of the present invention prevent or minimize the formation of mottling of the plasticized polymer film layer when the composite is wound upon itself to form a roll or when the composites are stacked one upon another. Although not intending to be bound by any theory, applicants believe that the presence of such plasticizer-resistant polymer backcoating or polymer film prevents or minimizes the migration of the plasticizer present in the plasticized polymer film to the surface of the polymer film. In addition, it is believed that migration of the plasticizers to the surface of the plasticized polymer film is promoted or encouraged when the plasticized polymer film is in contact with rough porous surfaces such as may occur when, a three-layer composite comprising a plasticized polymer film layer, an adhesive layer and a release-coated layer is wound upon itself into a roll whereupon the plasticized polymer layer is in contact with the backside of the release liner. When such rolls are unwound, mottling of the polyvinylchloride film is observed, particularly in the darker colors. In contrast, the composites of the present invention wherein the backside of the release liner is coated with a backcoating of a plasticizer-resistant polymer mottling is significantly reduced in the vinyl layer when the composite is either wound upon itself or the composites are stacked one upon another. In such instances, there is no direct contact between the plasticized polymer film and the relatively rough backside of the liner layer.

Any plasticizer-resistant polymer can be utilized as the backcoating (C) or the polymer film (D) described above. Examples of useful plasticizer-resistant polymer compositions include polymer selected from the group consisting of epoxy resins, phenolic resins, polyurethanes, amino resins, acrylic resins, and mixtures thereof. These polymers should be crosslinked to the extent that they cannot be dissolved, swollen or fused by solvents.

Thermosetting epoxy resins are particularly useful in the present invention and they include any of a number of well-known organic resins which are characterized by the presence therein of the epoxide group A wide variety of such resins are available commercially. Such resins have either a mixed aliphatic-aromatic or an exclusively non-benzeneoid (i.e., aliphatic or cycloaliphatic) molecular structure.

The mixed aliphatic-aromatic epoxy resins which are useful with the present invention are prepared by the well-known reaction of a bis(hydroxy-aromatic) alkane or a tetralds-(hydroxyaromatic)-alkane with a halogen-substituted aliphatic epoxide in the presence of a base such as, e.g., sodium hydroxide or potassium hydroxide. Under these conditions, hydrogen halide is first eliminated and the aliphatic epoxide group is coupled to the aromatic nucleus via an ether linkage. Then the epoxide groups condense with the hydroxyl groups to form polymeric molecules which vary in size according to the relative proportions of reactants and the reaction time.

In lieu of the epichlorohydrin, one can use halogen-substituted aliphatic epoxides containing about 4 or more carbon atoms, generally about 4 to about 20 carbon atoms. In general, it is preferred to use a chlorine-substituted terminal alkylene oxide (terminal denoting that the epoxide group is on the end of the alkyl chain) and a particular preference is expressed for epichlorohydrin by reason of its commercial availability and excellence in forming epoxy resins useful for the purpose of this invention.

If desired, the halogen-substituted aliphatic epoxide may also contain substituents such as, e.g., hydroxy keto, nitro, nitroso, ether, sulfide, carboalkoxy, etc.

Similarly, in lieu of the 2,2-bis-(p-hydroxyphenyl)-propane, one can use bis-(hydroxyaromatic) alkanes containing about 16 or more carbon atoms, generally about 16 to about 30 carbon atoms such as, e.g., 2,2-bis-(1-hydroxy-4-naphthyl)-propane; 2,2-bis(o-hydroxyphenyl)propane; 2,2-bis-(p-hydroxyphenyl) butane, 3,3-bis-(p-hydroxyphenyl)hexane; 2-(p-hydroxyphenyl)-4-(1-hydroxy-4-naphthyl)octane, 5-5-bis-(p-hydroxy-o-methylphenyl)-decane, bis-(p-hydroxyphenyl) methane,2,2-bis-(p-hydroxy-o-isopropylphenyl)propane,2,2-bis-(o,p-dihydroxyphenyl)propane, 2-(p-hydroxyphenyl)-5-(o-hydroxyphenyl)hexadecane, and the like. If desired, the bis-(hydroxyaromatic)alkane may contain substituents such as, e.g., halogen, nitro, nitroso, ether, sulfide, carboalkoxy, etc. In general, it is preferred to use a bis-(p-hydroxyphenyl)alkane since compounds of this type are readily available from the well-known condensation of phenols with aliphatic ketones or aldehydes in the presence of a dehydrating agent such as sulfuric acid. Particularly preferred is 2,2-bis-(p-hydroxyphenyl)propane, which is available commercially as "Bisphenol A".

Epoxy resins of the type described above are available from a wide variety of commercial sources. One group is known by the general trade designation "Epon" resins and are available from Shell Chemical Co. For example, "Epon 820" is an epoxy resin having an average molecular weight of about 380 and is prepared from 2,2-bis-(p-hydroxyphenyl)propane and epichlorohydrin. Similarly, "Epon 1031" is an epoxy resin having an average molecular weight of about 616 and is prepared from epichlorohydrin and symmetrical tetrakis-(p-hydroxyphenyl)ethane. "Epon 828" has a molecular weight of 350–400 and an epoxide equivalent of about 175–210.

Another group of commercially available epoxy resins are identified under the general trade designation EPI-REZ (Celanese Resins, a Division of Celanese Coatings Company). For example, EPI-REZ 510 and EPI-REZ 509 are commercial grades of the diglycidyl ether of Bisphenol A differing slightly in viscosity and epoxide equivalent.

Another group of epoxy resins are available from Fume Plastics Inc., Los Angeles, Calif. under the general trade designations EPIBOND and EPOCAST. For example, EPIBOND 100A is a one component epoxy resin powder available from Furane which is curable to a hard resin in the absence of any hardener.

Liquid forms of epoxy resin are also useful. These liquid forms normally comprise very viscous liquids requiting some degree of heating to permit withdrawal from storage containers. Certain "D.E.R." resins obtainable from Dow Chemical Company and "Epotuf" liquid epoxy resins obtainable from Reichhold Chemicals Inc. are examples of such resins preferred for employment in accordance with the invention. An example of an "Epotuf" liquid epoxy resin in the undiluted medium high viscosity #37-140 having an epoxide equivalent weight of 180–195, a viscosity (ASTM D445) of 11,000–14,000 cps at 25° C., and a Gardner Color Maximum of 3. This is a standard general purpose epoxy resin.

Epoxy resins such as Araldite 6010, manufactured by Ciba-Geigy or epoxy resins identified as Shell Product No. 828 can be utilized. These epoxy resins are of the glycidyl-type epoxide, and are preferably diglycidyl ethers of bisphenol A which are derived from bis-phenol and epichlorohydrin.

In some embodiments of the invention the epoxy resins may be "solubilized" by neutralization with a basic compound such as an organic amine. Examples of amines include amines and hydroxyamines including diethylamine, tdethylamine, triethanolamine, dimethylethanolamine, etc.

Polyurethane resins also are useful as plasticizer-resistant polymer backcoatings and films in the composite constructions of the present invention. Aliphatic or aromatic polyurethanes can be utilized. For example, aliphatic polyurethane resins such as Desmolac 4125, available from Mobay Chemical Company can be utilized. Desmolac 4125 is a reaction product of a cycloaliphatic isocyanate with a polyester resin and is applied in a 20% by weight solid solution in isopropanol and toluene.

The plasticizer-resistant polymer backcoating and film of the present invention may comprise isoeyanate-terminated polyurethane coatings and films which may be applied as comprising an inert organic solvent and an isocyanate-terminated polyurethane and thereafter removing the solvent from the applied solution leaving the desired backcoating or film. The isocyanate-terminated polyurethane polymers are also referred to in the art as "prepolymers," and these polymers may be formed by the reaction of selected polyols having an average molecular weight of from about 200 to about 2000 with a stoichiometric excess of an organic polyisocyanate. Such prepolymers are capable of chain extension and crosslinking (commonly called curing) with water or other chain-extending agents.

Any organic compound containing at least two active hydrogen atoms may be reacted with the stoichiometric excess of organic polyisocyanate to form an isocyanate-terminated prepolymer which is then capable of molecular weight increase by curing as described above. The prepolymers may have a free isocyanate content of from about 5% to about 20% by weight based on the prepolymer content.

Any of a wide variety of organic polyisocyanates can be employed in the formation of the polyurethane prepolymers useful in the invention. Diisocyanates are preferred, but minor amounts of other polyisocyanates can be included. The isocyanates may be aliphatic, aromatic or mixed aliphatic-aromatic isocyanates. The aliphatic and cycloaliphatic diisocyanates are preferred especially when it is preferred to have a non-yellowing urethane backcoating or film. The diisocyanates generally have from about 6 to about 40 carbon atoms, and more often from about 8 to about 20 carbon atoms in the hydrocarbon group. Suitable diisocyanates include the di(isocyanato cyclohexyl)methane, 1-isocyanato-3-isocyanatomethyl-3,3,5-trimethyl cyclohexane, hexamethylene diisocyanate, methylcyclohexyl diisocyanate, 2,4,4-trimethylhexamethylene diisocyanate, 2,6-tolylene diisocyanate, 2,4-tolylene diisocyanate, p-phenylene diisocyanate, p,p'-diphenylmethane diisocyanate, 1,5-naphthalene diisocyanate, etc. The aromatic diisocyanates usually have a lower resistance to the effects of ultra violet light.

As noted, polyols are preferred as the co-reactant in forming the prepolymers useful as coatings and films in the composites of the present invention. The polyols may be aliphatic, cycloaliphatic, aromatic or mixed structures. The polyols preferred contain a major mount of an aliphatic polyol having a molecular weight of at least about 300. These polyols are diols, including ether diols, triols including ether triols or mixtures thereof. Other polyols having greater than three hydroxy groups may also be used in conjunction with the diols and/or triols. The structure of the polyol is usually hydrocarbon in nature, but other substituents may be incorporated in the hydrocarbon moiety to effect changes in the properties of the resulting prepolymer. The molecular weights of these polyols average up to about 2000 or more but those of 300 to about 1000 average molecular weight are preferred. Examples of polyols useful in the present invention include polyoxyethylene glycols, polyoxypropylene glycols, polyoxybutylene glycols, etc. Useful monomeric glycols include ethylene glycol, propylene glycol, butene diols, 1,6-hexamethylene glycol, etc. Examples of triols include trimethylol propane, trimethylol ethane, glycerol, 1,2,6-hexane triol, etc.

Hydroxy-terminated polyester materials also are useful hydroxy reactants. Such hydroxy-terminated polyester materials can be prepared by the reaction of one or more of the polyhydroxy materials described above with one or more aliphatic, including cycloaliphatic, or aromatic polycarboxylic acids or esters, and such polyesters can often have hydroxyl values in the range of from about 25 to about 150. Examples of such acids include phthalic acid, adipic acid, sebacic acid, etc.

The isocyanate-terminated polyurethanes can be prepared by the simultaneous reaction of an excess organic polyisocyanate and polyol, or by reacting part or all of a polyol prior to reaction of the remaining amount of the material with the isoeyanate. Generally, it is preferred to add the polyisocyanate to an essentially inert organic solvent solution of polyol from which all moisture has been removed. The reaction between the polyol and the organic polyisocyanate generally is completed in about 1 to 3 hours in the absence of a catalyst. When a catalyst is used, a reaction period of about 10 minutes to about 3 hours is sufficient. When catalysts are used, they are typically organo tin compounds such as dibutyl tin dilaurate and stannous octoate. Other useful catalysts include tertiary aliphatic and alicyclic amines such as triethylamine, triethanolamine, tri-n-butylamine, etc. Mixtures of catalysts can also be employed.

The amino resins (sometimes referred to as aminoplast resins or polyalkylene amides) useful in forming the backcoatings or removable plasticizer-resistant films are nitrogen-rich polymers containing nitrogen in the amino form, —$NH_2$. The starting amino-bearing material is usually reacted with an aldehyde (e.g., formaldehyde) to form a reactive monomer, which is then polymerized to a thermosetting resin. Examples of amino-bearing materials include urea, melamine, copolymers of both with formaldehyde, thiourea, aniline, dicyanodiamide, toluene sulfonamide, benzoguanamine, ethylene urea and acrylamide. Preferred amino resins are the melamine-formaldehyde, melamine alkyd, and urea-formaldehyde resins.

Condensation products of other amines and amides can also be employed, for example, aldehyde condensates of triazines, diazines, triazoles, guanadines, guanamines and alkyl- and aryl-substituted derivatives of such compounds including alkyl- and aryl-substituted ureas and alkyl- and aryl-substituted melamines. Some examples of such compounds are N,N'-dimethylurea, benzourea, dicyandiamide, 2-chloro-4,6-diamino-1,3,5-triazine and 3,5-diaminotriazole. Other examples of melamine and urea-based crosslinking resins include alkylated melamine resins including methylated melamine-formaldehyde resins such as hexamethoxymethyl melamine, alkoxymethyl melamines and ureas in which the alkoxy groups have 1–4 carbon atoms such as methoxy, ethoxy, propoxy, or butoxymethyl melamines and dialkoxymethyl ureas; alkylol melamines and ureas such as hexamethylol melamine and dimethylol urea. The aminoplast cross-linking resins are particularly useful when another thermosetting resin in the aqueous composition is an alkyd resin, a polyester resin, an epoxy resin or an acrylic resin.

Melamine resins, and more particularly, melamine-formaldehyde resins may be utilized as the polymer backcoating or removable polymer film of the composite constructions of the present invention. Melamine resins which can be used include those which have been described as highly or partially methylated melamine-formaldehyde resins, high amino melamine-formaldehyde resins, mixed ether and butylated melamine-formaldehyde resins, etc.

The partially methylated melamine-formaldehyde resins generally contain a methoxymethhyl-methylol functionality such as represented by the following formula (IV)

A series of such partially methylated melamine formaldehyde resins is available from American Cyanamid Company under the trade designations CYMEL 370, 373, 380 and 385 resins.

A series of highly methylated melamine resins containing a methoxymethyl functionality as represented by the following formula (V)

also is available from Cyanamid under the general trade designations Cymel 300, 301, 303 and 350 resins. The various resins in this series differ in their degree of 75%; alkylation and in monomer content. The monomer content in Cymel 300 is about in Cymel 301, about 70%; and Cymel 303, about 58%; and in Cymel 350, 68%.

High imino melamine resins contain methoxymethyl-imino functionalities such as may be represented by the following Formula VI.

(VI)

A series of melamine-formaldehyde resins known as high imino resins are available from Cyanamid under the wade designations Cymel 323, 325 and 327.

Mixed ether and butylated melamine resins are available from Cyanamid under the general trade designations Cymel 1100 resins, and these contain an alkoxy methyl functionality as illustrated by Formula VII.

(VII)

wherein $R^1$ and $R^2$ may be different alkyl groups such as methyl, ethyl, butyl or isobutyl groups, or both $R^1$ and $R^2$ may be butyl groups.

Cymel 1158 resin is a melamine formaldehyde resin available from Cyanamid which contains butoxy-imino functionality as represented by the following Formula VIII.

(VIII)

Other useful amino resins available from Cyanamid under the CYMEL® designation include benzoguanamine-formaldehyde resins (CYMEL 1123 resin), glycoluril-formaldehyde resins (CYMEL 1170, 1171 and 1172) and carboxyl-modified amino resins (CYMEL 1141 and 1125).

The acrylic resins which may be used in the invention are obtained by polymerizing a suitable combination of a functional group-containing monomer and another copolymerizable monomer in an ordinary manner. The polymerization temperature is ordinarily between about 60° C. and about 100° C., and polymerization time is usually within a range of about 3 to about 10 hours. Examples of the functional group-containing monomers include hydroxyl group-containing monomers such as beta-hydroxyethyl acrylate, beta-hydroxypropyl acrylate, beta-hydroxyethyl methacrylate, beta-hydroxypropyl methacrylate, N-methylol acrylamide and N-methylol methacrylamide; carboxyl group-containing monomers such as acrylic acid, methacrylic acid, itaconic acid, maleic acid, fumaric acid, as well as monoesters of maleic acid and fumaric acid with monoalcohols; alkoxyl group-containing monomers such as N-butoxy-methylmethacrylamide and N-butoxymethylacrylamide; and epoxy group-containing monomers such as glycidyl methacrylate, glycidyl acrylate and allyl glycidyl ether. These monomers may be used either alone or in the form of a combination of two or more of them. The functional group-containing monomer is used in an amount of about 5 to about 40% by weight of total monomers. Examples of the monomers copolymerize with these functional group-containing monomers include olefinically unsaturated monomers such as ethylene propylene and isobutylene; aromatic monomers such as styreric, vinyl toluene and alpha-methyl styrene; ester of methacrylic acid and alcohols of 1 to about 18 carbon atoms such as methylmethacrylate, ethylmethacrylate, propylmethacrylate, n-butylmethacrylate, isobutylmethacrylate, cyclohexylmethacrylate, 2-ethylhexylmethacrylate and laurylmethacrylate; vinyl esters of carboxylic acid of about 1 to about 11 carbon atoms such as vinyl acetate, vinyl propionate and vinyl 2-ethylhexylic acid; as well as vinyl chloride, acrylonitrile and methacrylonitrile. They may be used either alone or in the form of a mixture of two or more of them.

The phenolic resins are any of the several types of synthetic thermosetting resins made by reacting a phenol, cresols, xylenols, p-t-butyl phenol p-phenyl phenol, bisphenols and resorcinol. Examples of the aldehydes include formaldehyde, acetaldehyde and furfural. Phenol-formaldehyde resins are a preferred class of such phenolic resins.

When the composite constructions of the present invention contain a plasticizer-resistant polymer backcoating on the other surface (back surface) of the release-coated liner, the thickness of the polymer backcoating will generally range from about 0.2 to about 0.8 mils, and more often from about 0.4 to about 0.6 mils. When the composite constructions of the present invention contain a removable plasticizer-resistant polymer film in contact with the face side of the layer of plasticized polymer film, the plasticizer-resistant polymer film generally will have a thickness in the range of from about 0.1 mils to about 0.8 mils, and more often from about 0.3 to about 0.7 mils.

In one embodiment of the present invention, the composite constructions of the present invention may contain a pressure-sensitive adhesive layer between one surface of the layer of the plasticized polymer film and one surface of the release-coated liner described above. The pressure-sensitive adhesive can be applied directly to the one surface of the layer of plasticized polymer film prior to joining the various layers of the composite, or the pressure-sensitive adhesive layer can be applied to the release-coated surface of the liner. Generally, the adhesive is applied to the release-coated surface of the liner and upon formation of the composite, the pressure-sensitive adhesive is transferred to the surface of the layer of plasticized polymer film.

Pressure-sensitive adhesive compositions which may be used in the composites of this invention are described in, for example, "Adhesion and Bonding", *Encyclopedia of Polymer Science and Engineering*, Vol. 1, pages 476–546, Interscience Publishers, 2nd Ed. 1985, the disclosure of which is hereby incorporated by reference. Such compositions generally contain an adhesive polymer such as natural, reclaimed or styrene butadiene rubber, tackified natural and synthetic rubbers, styrene butadiene or styrene isoprene block copolymers, random copolymers of ethylene and vinyl acetate, ethylene-vinyl-acrylic terpolymers, polyisobutylene, poly(vinyl ether), poly(acrylic) ester, etc., as a major constituent.

Block copolymers which may be employed in the adhesive compositions may be thermoplastic block copolymers having linear, radial or star configurations and having the A block and B block formed into what are generally termed as ABA block copolymers. The A block is a monoalkenyl arene, mainly polystyrene, having a molecular weight between 4,000 and 50,000, preferably between 7,000 and 30,000. The A block content is from about 10% to 50%, more preferably between 10% and 30%. Other suitable A block may be formed from alpha-methyl styrene, t-butyl styrene and other ring alkylated styrenes as well as mixtures thereof. B is an elastomeric conjugated diene such as butadiene or isoprene having an average molecular weight of from about 5,000 to about 500,000, preferably from about 50,000 to 200,000. Preferably, ABA triblock and AB diblock copolymers will comprise the majority of the block copolymer elastomer of the adhesive, the percent diblock being less than 95% of the block copolymer, preferably less than 85%, and more preferably less than 75%. Other conventional diene elastomers may be used to a minor extent, but not so as to significantly effect the adhesion properties. The block copolymer is used in an amount ranging from about 30% to 60% by weight, preferably at 35% to 55% by weight of the adhesive composition.

Specific examples of ABA-type copolymers of styrene and isoprene are Kraton 1107 and Kraton 1117 from Shell Chemical Company. ABA-type copolymers of styrene-butadiene are available from Firestone under the designations Steron 840A and 845A. Other commercially available copolymer adhesives include: random copolymer of ethylene and vinyl acetate having a melt-flow index of 2500 in a vinyl acetate content of 14% by weight (Escorene MVO-2514), available from Exxon Chemical; styrene butadiene block synthetic rubber having a styrene content of 30% by weight (Finaprene 411), available from Fina Chemical Company; random copolymer of ethylene and vinyl acetate having a melt-flow index of 148 and a vinyl acetate content of 18.5% by weight (Elvax 420), available from DuPont; and random copolymer of ethylene and vinyl acetate having a melt-flow index of 57 and a vinyl acetate content of 40% by weight of an Elvax 40W.

Other materials may be included in the adhesive compositions such as solid tackifying resins, liquid tackifiers (often referred to as plasticizers), anti-oxidants, fillers, pigments, waxes, etc. The adhesive generally contains a blend of solid tackifying resin and liquid tackifying resin or liquid plasticizer.

The tackifying resins can be selected from the group of resins at least partially compatible with the B blocks of the elastomeric block copolymer materials of this invention. Such tackifying resins include those aliphatic hydrocarbon resins made from the polymerization of a feed stream consisting mainly of unsaturated species containing 4 to 6 carbon atoms; rosin esters and rosin acids; mixed aliphatic/aromatic tackifying resins; polyterpene tackifiers; and hydrogenated tackifying resins. The hydrogenated resins can include resins made from the polymerization and subsequent hydrogenation of a feedstock consisting mostly of dicyclopentadiene; resins produced from the polymerization and subsequent hydrogenation of pure aromatic feedstocks such as styrene, alpha-methyl styrene, vinyl toluene; resins fashioned from the polymerization and subsequent hydrogenation of an unsaturated aromatic feedstream wherein the feedstream mainly contains species having from 7 to 10 carbon atoms; hydrogenated polyterpene resins; and hydrogenated aliphatic and aliphatic/aromatic resins. Preferred tackifying resins include the aliphatic hydrocarbon resins and the hydrogenated resins. Especially preferred are the aliphatic hydrocarbon resins. Specific examples include rosin acids, rosin esters, styrenated terpene resins, oil-soluble phenolics, and polyterpenes. Commercially available tackifying resins include Escorez 1310 from Exxon Chemical Co., Wingtack Plus, Wingtack 10 and Wingtack 95 available from Goodyear Chemical Co., Hercolyn D from Hercules, Inc., and Zonarez A-25 from Anzona Chemical Co. The tackifying resin component can comprise the remainder of the functional adhesive composition, i.e., from 65% to 45% by weight. If a solid tackifier is employed, generally it will comprise from 25% to 60% by weight of the functional adhesive composition, preferably from 30% to 55% by weight. The liquid tackifying resin correspondingly would comprise 0–30% by weight of the functional adhesive composition, preferably from 5% to 20% by weight. Using the preferred level of solid and liquid tackifiers yields adhesives with a better balance of high peel adhesion values and shear adhesion values with good initial tack.

The adhesive preferably is tackified with solid tackifying resin with liquid plasticizer and/or liquid resin of the above-described preferred types.

In one embodiment of the present invention, the adhesives may comprise from about 35–60% by weight of a synthetic thermoplastic block copolymer rubber as described above, about 30–60% by weight of at least one solid tackifying resin, 0 to about 20% by weight of a liquid tackifying resin, 0 to about 20% by weight of liquid extender oil, and a small amount of an antioxidant.

The choice of the pressure-sensitive adhesive to be used in any composite of the invention is not critical to this invention, and those skilled in the art are familiar with the many suitable pressure-sensitive adhesives for particular applications. The thickness of the layer of pressure-sensitive adhesive is generally in the range of about 0.5 to about 3 mils. More often a thickness of about 1 mil is effective.

When the composite construction of the present invention is prepared in a form for winding upon itself in roll form, the composite generally comprises
(A) a layer of plasticized polymer film;
(B) a release-coated liner;

(C) a pressure-sensitive adhesive layer between one surface of the layer of plasticized vinyl film (A) and one surface of the release-coated liner (B); and (D) a plasticizer-resistant polymer backcoating on the other surface of the release-coated liner wherein formation of mottling on the surface of the plasticized polymer film when the composite construction is wound upon itself is minimized or eliminated.

In another embodiment such as when the composite constructions of the present invention are prepared in sheet form, and the multilayer sheets may be stacked one upon each other such as on storage, the composite constructions may comprise (A) a layer of plasticized polymer film;
(B) a release-coated liner;
(C) a pressure-sensitive adhesive layer between one surface of the layer of plasticized polymer film (A) and one surface of the release-coated liner (B); and either
(D) a plasticizer-resistant polymer backcoating of the other surface of the release-coated liner (B) which is essentially impervious to the plasticizer in (A); or
(E) a removable plasticizer-resistant polymer film in contact with the other surface of the layer of plasticized polymer film. Thus, when the composites are stacked one upon another, the layer of plasticized polymer film in one of the composites in the stack does not contact the release-coated liner of another multilayer sheet or composite in the stack. In this manner, formation of mottling on the surface of the plasticized polymer film is minimized or eliminated. When the composites of the present invention which are in sheet form and which have a removable plasticizer-resistant polymer film in contact with the plasticized polymer film are to be used, the removable plasticizer-resistant polymer film is removed to expose the surface of the layer of plasticized polymer film.

Figures 1, 2:
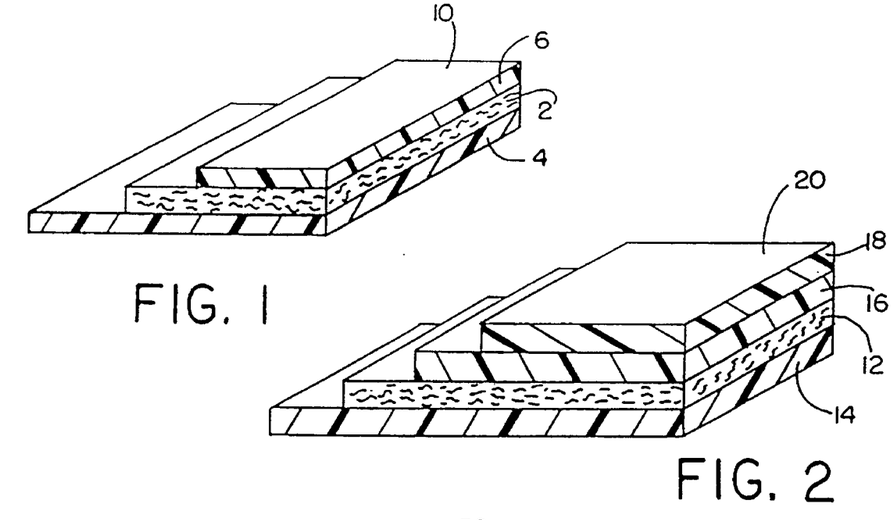
FIG. 1 is a cross-section of a composite construction in accordance with one embodiment of the present invention.
FIG. 2 is a cross-section of another composite construction in accordance with the present invention.

A composite construction in accordance with one embodiment of the invention is illustrated in FIG. 1 wherein the composite is indicated by reference numeral 10. The composite comprises a plasticized polymer film 6, a release-coated liner 2 and a plasticizer-resistant backcoating 4 in contact with the release liner 2.

A composite construction in accordance with another embodiment of the present invention is illustrated in FIG. 2, and the composite generally is indicated by reference numeral 20. The composite comprises a layer of plasticized polymer film 18, a release-coated liner 12, and an adhesive 16 between the layer of plasticized polymer film 18 and the release-coated liner 12. A plasticizer resistant backcoating 14 is shown in contact with the release-coated liner 12.

Figure 3:
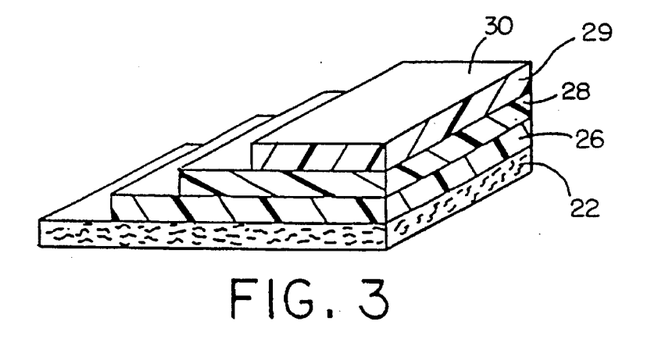
FIG. 3 is a cross-section of yet another composite construction in accordance with the present invention.

A third embodiment of the composites of the present invention is illustrated in FIG. 3, and the composite generally is indicated by reference numeral 30. The composite comprises a plasticized polymer film 28, a release-coated liner 22, and an adhesive layer 26 between the plasticized polymer film 28 and the release-coated liner 22. A removable plasticizer-resistant film 29 is shown in contact with the face surface of the plasticized polymer film 28.

Figure 4:
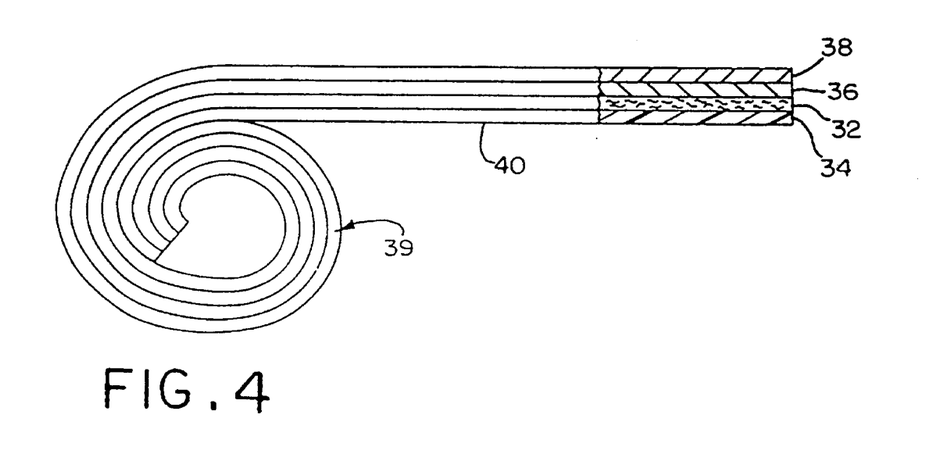
FIG. 4 is a perspective and cross-section view of a composite of the type illustrated in FIG. 2 partially wound upon itself.

FIG. 4 is an expanded perspective and cross-sectional view of a composite similar to the composite of FIG. 2 partially wound upon itself to form a roll. The composite is generally indicated by reference numeral 40, and the roll is indicated by reference numeral 39. The composite 40 comprises a plasticized polymer film 38, a release-coated liner 32, an adhesive layer 36 between the plasticized polymer film 38 and the release-coated liner 32, and a plasticizer-resistant backcoating 34. As can be seen from roll 39, when the composite 40 is wound upon itself, the exposed surface (face surface) of the plasticized polymer film 38 comes into contact with the plasticizer-resistant backcoating 34, and in this manner, plasticizer migration to the surface of the plasticized polymer film 38 is minimized or eliminated. In the absence of the plasticizer-resistant film 34, the plasticized polymer film 38 would be in contact with the back surface of release-coated liner 32 when the composite 40 is wound upon itself to form a roll 39, and the plasticizer in the plasticized polymer film would be free to migrate to the surface of the plasticized polymer film 38 and into the release-coated liner 32 thereby promoting mottling of the plasticized polymer film. This mottling would be evident when the roll is unwound and the face of the plasticized polymer film is exposed.

The present invention also relates to a process of minimizing or eliminating mottling in a plasticized polymer film of a composite construction which comprises (A) a layer of plasticized polymer film having a face side and a back side; and
(B) a release-coated liner having one surface in contact with the back side of the layer of plasticized polymer film; which process comprises applying either
(C) a plasticizer-resistant polymer backcoating to the other surface of the release-coated liner of (B) which is essentially impervious to the plasticizer in (A); or
(D) a removable plasticizer-resistant polymer film in contact with the face side of the layer of plasticized polymer film (A).

The plasticizer-resistant polymer backcoating on the surface of the release-coated liner may be formed by applying the polymer in liquid form to the back side of the release-coated liner and allowing the polymer to harden (cure). Alternatively, the polymer can be applied as an emulsion or solution in water or organic solvent followed by removal of the water or solvent. The viscosity of the emulsion or solution should be suitable for coating applications. However, the solvent should be easily removed after the solution is applied to the liner. Thus, volatile solvents are preferred. The backcoatings applied to the release liner may comprise a plurality of films deposited by repeated application of an emulsion or solution with evaporation of the water or solvent between applications. The water or solvent may be removed from the applied solution or emulsion by a variety of methods, but air drying under forced air conditions at elevated temperatures provides a satisfactory film substantially free of water or solvent.

The plasticizer-resistant polymer film which is, in one embodiment, applied to the face side of the layer of plasticized polymer film may be applied as a pre-formed film of desired thickness or the film may be formed in situ by applying a coating of a liquid polymer or a solution or emulsion the plasticizer-resistant polymer in a solvent or water such as described above. Preformed films of the plasticizer-resistant polymer can be prepared by techniques well known to those skilled in the art and subsequently brought into contact with the face side of the layer of plasticized polymer film, generally with a minimum of pressure. Such applied films can be easily lifted and removed from contact with the face side of the plasticized polymer film.

The following examples illustrate the composite constructions of the present invention.

Example A

A composite is prepared of the type illustrated in FIG. 1 which comprises a plasticized polyvinylchloride film of about 2 mils thickness in contact with a release-coated paper about 4 mils thick with a backcoating on the release paper of an epoxy resin wherein the thickness of the backcoating is about 0.5 mil.

Example B

A composite is prepared which comprises a polyvinylchloride film (face) which is about 2.2 mils thick, a silicone-release-coated paper liner which is about 4.2 mils thick, a pressure-sensitive adhesive between the plasticized polyvinylchloride film and the silicone-release-coated paper, the thickness of the pressure-sensitive adhesive layer being about 1 mil, and a backcoating of an epoxy resin available commercially as "E-Prime" from Daubert Coated Products, Inc., Willowbrook, Ill. The thickness of the backcoating is about 0.5 mil.

Example C

A composite is prepared which is similar to the composite of Example B except that the backcoating comprises a melamine resin, an alkyd of phthalic anhydride and linseed oil or similar fatty acid. The melamine-alkyd-based resin is identified as CP-95 and available from Ivex Packaging Corp., Troy, Ohio.

Example D

A composite is prepared which is similar to the composite of Example B except that the backcoating is a melamine-alkyd-type resin identified as Patent OB from the S. D. Warren Company, Westbrooke, Ma.

Example E

A composite is prepared which is similar to the composite of Example B except that the backcoating comprises an acrylate and urethane resin mixture identified as PWA-Super which is available from PWA-Kunststoff Gmbh, Raubling Germany.

The composite constructions of the present invention may be further described as containing a plasticizer-resistant backcoating which is characterized as having a smooth, glossy surface. The smoothness of the backcoating is expressed as a Sheffield smoothness which is a measure of the surface smoothness of the film of the backcoating using a constant pressure air flow between the backcoating and two concentric annular lands. The unit of measure is a Sheffield unit, and this unit is a measure of the surface resistance of the sample to air flow. The test is conducted in accordance with the procedure of TAPPI Test Method T-538 om-88.

The glossiness of the backcoating or the removable plasticizer-resistant polymer film which is in contact with the surface of the plasticized polyvinylchloride film is measured in accordance with TAPPI TM-40 02-72 Specular Gloss using a Hunter Associate's Laboratory, Inc., D16 Gloss Meter. In general, the test provides a means to numerically qualify the gloss level of a surface by shining a beam of light on the surface at angles of 20°, 60° and 85° and measuring the resulting specular reflectance of the film. In one embodiment, the Hunter gloss of the backcoatings at 60° may range from about 70 to about 110 and more often is in the range of about 75 to about 100.

The distinctiveness of image (D.O.I.) test is designed to measure the mirror-like qualities of a surface. In general, the test instrument employs a converging beam of light emitted from a halogen light source which reflects from a sample surface at a 30° incident angle. After the light is reflected, the test unit quantifies the sharpness and clarity of the image on a scale of 0 to 100, with 100 representing a perfect mirror surface. The D.O.I. test differs from gloss testing in that gloss meters measure the quantity of reflected light, whereas the D.O.I. meter concentrates on the quality and distinctiveness of a reflective image. Consequently, a material could be characterized by high gloss and low D.O.I. or low gloss and high D.O.I. The unit used to perform the measurement is the Hunter Lab Dorigon Meter D47-6, and testing is conducted in accord with ASTM Method D523.

Although it is typical to acquire D.O.I. readings from a film applied to a panel, the data compiled in Table I were collected from free film samples that were not applied to a panel. Thus a more accurate representation of the film characteristics was obtained. In one preferred embodiment, a minimum film D.O.I. obtained in this fashion is about 10.

The surface energy of the polymeric coating is determined using a Rame-Hart Goniometer. To determine the surface energy of the coating, drops of two solutions of known surface tension are placed on the coating surface and the contact angle of the droplets on the coatings is measured. The contact angle data are then used to calculate the surface energy of the coating by the geometric mean treatment developed by Kaelble. (Reference: Kaelble, D. H., *J. Adhesion*, Vol. 2, April 1970, page 66.)

The test procedure used to measure mottle utilizes a personal computer and an optical scanner, which essentially simulates an image analyzer on a macroscopic scale. Since mottle is a macroscopic visual phenomenon, test approaches utilizing a micro-surface analysis, such as image analysis or scanning electromicroscopy, are not warranted.

The test first consists of reproducing a digitized image of the vinyl surface on a computer monitor using an optical scanner. The reproduced digital image formed on the screen is represented by pixels, each of which is set for a specific gray level. For example, the equipment employed for this test contained 600 pixels per inch and 256 color levels, ranging from black (designated by "0") to white (designated by "255"). Though the accuracy of the test can be enhanced with higher resolution equipment, the system employed for this test was observed to be sufficient.

After the image has been digitized, the various gray level associated with each pixel are tabulated into a frequency histogram according to the gray level intensity for each pixel. The histogram can be most efficiently compiled using commercially available software, such as Image Pro Plus. Since mottle, as previously defined, can be represented from varying gray levels, the percent mottle present on the surface can be measured by calculating the fraction of pixels which have deviated from the mean intensity of the sample. For instance, black vinyl film typically exhibits a mean intensity of "0". Thus, all gray levels deviating from "0" can be considered mottle areas, if personal judgment is so applied.

Some of the characteristics of the backcoatings of Examples B–E are summarized in the following Table I.

TABLE I

| | Backcoating Characteristics | | | | |
|---|---|---|---|---|---|
| | Hunter Gloss | | | Total Surface | |
| Example | (20°) | (60°) | (85°) | Energy | D.O.I. |
| B | 27 | 76 | 78 | 29.6 | 3.8 |
| C | 53 | 97 | 93 | 34.0 | 10.7 |
| D | 51 | 97 | 94 | 32.2 | 9.6 |
| E | 90 | 100 | 98 | 41.5 | 25.4 |

Some of the characteristics of the polyvinyl films of the composite constructions of Examples B–E are summarized in the following Table II. The characteristics summarized in Table II were observed after the composite was placed in a Carver press with a removable plasticizer-resistant film over the plasticized polyvinyl film. The plasticizer-resistant film is of the same material as the backcoating of the composite. Pressure is applied to the composite and film to simulate the pressure on the polyvinyl chloride film when the composite is wound into a roll and stored. In this test, the composite and film are mounted in the press for about one hour before the characteristics in Table II are measured.

TABLE II

| | Polyvinyl Film Characteristics | | | | |
|---|---|---|---|---|---|
| | Hunter Gloss | | | Mottle | |
| Example | (20°) | (60°) | (85°) | (%) | D.O.I. |
| B | 27 | 70 | 81 | 0.5 | 6.8 |
| C | 58 | 93 | 95 | 0.4 | 21.0 |
| D | 53 | 91 | 96 | 0.4 | 22.6 |
| E | 92 | 97 | 98 | 0.2 | 24.4 |

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

We claim:

1. A composite construction comprising:

(A) a layer of plasticized polymer film having a face side and a back side;

(B) a release-coated liner having one surface in contact with the back side of the layer of plasticized polymer film; and either (C) a plasticizer-resistant polymer backcoating on the other surface of the release-coated liner (B) which is essentially impervious to the plasticizer in (A); or (D) a removable plasticizer-resistant polymer film in contact with the face side of the layer of plasticized polymer film (A).

2. The composite construction of claim 1 wherein the layer of plasticized polymer film (A) comprises a plasticized vinyl film.

3. The composite construction of claim 1 wherein the layer of plasticized polymer film (A) comprises a plasticized polyvinylchloride film.

4. The composition construction of claim 1 wherein the layer of plasticized polymer film (A) comprises a highly plasticized polyvinylchloride film containing from about 10% to about 60% by weight of at least one plasticizer.

5. The composite construction of claim 1 wherein there is an adhesive layer between the layer of plasticized polymer film (A) and the release-coated liner (B).

6. The composite construction of claim 1 wherein the release-coated liner (B) is a release-coated paper liner.

7. The composite construction of claim 1 wherein the plasticizer-resistant polymer backcoating (C) or film (D) comprises an epoxy resin or a melamine-alkyd resin.

8. The composite construction of claim 1 wherein the plasticizer-resistant polymer backcoating (C) or film (D) comprises an aliphatic-aromatic epoxy resin.

9. A composite construction capable of being wound upon itself in roll form and being readily unwound for use which comprises:

(A) a layer of plasticized vinyl film;

(B) a release-coated liner;

(C) a pressure-sensitive adhesive layer between one surface of the layer of plasticized vinyl film (A) and one surface of the release-coated liner (B); and (D) a plasticizer-resistant polymer backcoating on the other surface of the release-coated liner wherein formation of mottling on the surface of the vinyl film when the composite construction is wound upon itself is minimized or eliminated.

10. The composite construction of claim 9 wherein the layer of plasticized vinyl film comprises plasticized polyvinyl chloride.

11. The composite construction of claim 9 wherein the release-coated liner is a release-coated paper liner.

12. The composite construction of claim 9 wherein the plasticizer-resistant polymer backcoating comprises a polymer selected from the group consisting of epoxy resins, polyurethanes, amino resins, acrylic esters, and mixtures thereof.

13. The composite construction of claim 9 wherein the plasticizer-resistant backcoating (D) comprises an aliphatic-aromatic epoxy resin or a melamine-alkyd resin.

14. The composite construction of claim 9 wherein the layer of plasticized vinyl film (A) is a plasticized polyvinylchloride comprising 40% to 90% by weight of polyvinylchloride and about 10% to 60% by weight of at least one plasticizer.

15. The composite construction of claim 9 wherein the 60° Hunter Gloss of the plasticizer resistant backcoating (D) is in the range of from about 75 to about 100, and the caliper of the backcoating is from about 0.2 to about 0.8 mils.

16. A plurality of composite constructions stacked upon each other as separate sheets wherein the composite constructions comprise (A) a layer of plasticized vinyl film;

(B) a release-coated liner;

(C) a pressure-sensitive adhesive layer between one surface of the layer of plasticized vinyl film (A) and one surface of the release-coated liner (B); and either (D) a plasticizer-resistant polymer backcoating on the other surface of the release-coated liner (B) which is essentially impervious to the plasticizer in (A); or (E) a removable plasticizer-resistant polymer film in contact with the other surface of the layer of plasticized vinyl film (A) whereby a layer of plasticized vinyl film (A) in one composite does not contact the release-coated liner of another composite, and formation of mottling on the surface of the vinyl film is minimized or eliminated.

17. The composite constructions of claim 16 wherein the layer of plasticized vinyl film comprises plasticized polyvinyl chloride.

18. The composite constructions of claim 16 wherein the release-coated liner is a release-coated paper liner.

19. The composite constructions of claim 16 wherein the plasticizer-resistant polymer backcoating comprises a polymer selected from the group consisting of epoxy resins, polyurethanes, amino resins, acrylic esters and mixtures thereof.

20. The composite constructions of claim 16 wherein the plasticizer-resistant backcoating (D) or film (E) comprises an aliphatic-aromatic epoxy resin.

21. The composite constructions of claim 16 wherein the plasticizer backcoating (D) or film (E) comprises a melamine resin.

22. The composite constructions of claim 16 wherein the layer of plasticized vinyl film (A) is a plasticized polyvinylchloride comprising about 40% to 90% by weight of polyvinylchloride and about 10% to 60% by weight of at least one plasticizer.

23. A composite construction wound upon itself in roll form and capable of being readily unwound for use which comprises:

(A) a layer of plasticized vinyl film;

(B) a release-coated liner;

(C) a pressure-sensitive adhesive layer between one surface of the layer of plasticized vinyl film (A) and one surface of the release-coated liner (B); and (D) a plasticizer-resistant polymer backcoating on the other surface of the release-coated liner wherein formation of mottling on the surface of the vinyl film when the composite construction is wound upon itself is minimized or eliminated.

24. The composite construction of claim 23 wherein the layer of plasticized vinyl film comprises plasticized polyvinyl chloride.

25. The composite construction of claim 23 wherein the release-coated liner is a release-coated paper liner.

26. The composite construction of claim 23 wherein the plasticizer-resistant polymer backcoating comprises a polymer selected from the group consisting of epoxy resins, polyurethanes, amino resins, acrylic esters and mixtures thereof.

27. The composite construction of claim 23 wherein the plasticizer-resistant backcoating (D) comprises an aliphatic-aromatic epoxy resin.

28. The composite construction of claim 23 wherein the plasticizer-resistant backcoating (D) comprises a melamine resin.

29. The composite construction of claim 23 wherein the layer of plasticized vinyl film (A) is a plasticized polyvinylchloride comprising 40% to 90% by weight of polyvinylchloride and about 10% to 60% by weight of at least one plasticizer.

30. The composite construction of claim 23 wherein the 60° Hunter Gloss of the plasticizer resistant backcoating (D) is in the range of from about 75 to about 100 and the caliper of the backcoating is from about 0.2 to about 0.8 mils.

31. A process of minimizing or eliminating mottling in a plasticized polymer film of a composite construction comprising (A) a layer of plasticized polymer film having a face side and a back side; and (B) a release-coated liner having a release-coated surface in contact with the backside of the layer of plasticized polymer film; which process comprises applying either (C) a plasticizer-resistant polymer backcoating on the other surface of the release-coated liner (B) which is essentially impervious to the plasticizer in (A); or (D) a removable plasticizer-resistant polymer film in contact with the face side of the layer of plasticized polymer film (A).

32. The process of claim 31 which comprises applying (C) a plasticizer-resistant polymer backcoating on the other surface of the release-coated liner (B) which is essentially impervious to the plasticizer in (A).

33. The process of claim 31 wherein the layer of plasticized polymer film (A) comprises a plasticized polyvinylchloride film.

34. The composite construction of claim 31 wherein the layer of plasticized polymer film (A) comprises a highly plasticized polyvinylchloride film containing from about 10% to about 60% by weight of at least one plasticizer.

35. The process of claim 31 wherein there is a layer of adhesive between the layer of plasticized polymer film (A) and the release-coated liner (B).

36. The process of claim 35 wherein the release-coated liner (B) is a release-coated paper liner.

37. The process of claim 31 wherein the plasticizer-resistant polymer backcoating (D) and the removable plasticizer-resistant polymer film (E) comprise a polymer selected from the group consisting of epoxy resins, polyurethanes, amino resins, acrylic esters and mixtures thereof.

38. The process of claim 37 wherein the plasticizer-resistant polymer backcoating or removable plasticizer-resistant polymer film is selected from aliphatic-aromatic epoxy resins and melamine resins.

* * * * *